United States Patent
Kivisaari et al.

(10) Patent No.: US 7,947,401 B2
(45) Date of Patent: May 24, 2011

(54) PREHEATING ARRANGEMENT IN A FUEL CELL APPARATUS

(75) Inventors: Timo Kivisaari, Helsinki (FI); Timo Mahlanen, Helsinki (FI)

(73) Assignee: Wärtsilä Finland Oy, Vaasa (FI)

( * ) Notice: Subject to any disclaimer, the term of this patent is extended or adjusted under 35 U.S.C. 154(b) by 891 days.

(21) Appl. No.: 11/722,872

(22) PCT Filed: Dec. 20, 2005

(86) PCT No.: PCT/FI2005/050467
§ 371 (c)(1),
(2), (4) Date: Jun. 26, 2007

(87) PCT Pub. No.: WO2006/072651
PCT Pub. Date: Jul. 13, 2006

(65) Prior Publication Data
US 2009/0035610 A1    Feb. 5, 2009

(30) Foreign Application Priority Data
Jan. 3, 2005    (FI) .................................... 20055002

(51) Int. Cl.
*H01M 8/04* (2006.01)
*H01M 8/14* (2006.01)
*H01M 8/10* (2006.01)

(52) U.S. Cl. ......... 429/428; 429/433; 429/472; 429/479

(58) Field of Classification Search .................. 429/13
See application file for complete search history.

(56) References Cited

U.S. PATENT DOCUMENTS

| | | | |
|---|---|---|---|
| 5,308,456 A * | 5/1994 | Kunz et al. ..................... | 429/16 |
| 6,077,620 A | 6/2000 | Pettit | |
| 6,413,661 B1 | 7/2002 | Clingerman et al. | |
| 6,541,142 B1 | 4/2003 | Yu et al. | |
| 2003/0072978 A1* | 4/2003 | Meyer et al. ..................... | 429/13 |
| 2004/0146763 A1* | 7/2004 | Pondo et al. ..................... | 429/26 |

FOREIGN PATENT DOCUMENTS

| | | | |
|---|---|---|---|
| JP | 5003043 | | 1/1993 |
| JP | 05003043 A | * | 1/1993 |
| WO | 0201663 | | 1/2002 |

* cited by examiner

*Primary Examiner* — Jennifer K. Michener
*Assistant Examiner* — Eli S Mekhlin
(74) *Attorney, Agent, or Firm* — Chernoff, Vilhauer, McClung & Stenzel

(57) ABSTRACT

The present invention relates to a preheating arrangement in a fuel cell apparatus, the fuel cell apparatus comprising at least a fuel cell unit, the fuel cells of which include an anode side and a cathode side and an electrolyte therebetween and in which fuel cell apparatus there is at least a fuel inlet into the anode side and an oxygen-containing gas inlet into the cathode side as well as a de-sulphuring unit and a fuel modifying unit and an afterburner for combusting the exhaust gases of the anode and/or cathode sides. According to the invention, a separate fuel channel has been arranged for the afterburner for introducing fuel to the afterburner at least during the start-up phase of the fuel cell apparatus and that at least a portion of the exhaust gases formed in the combustion of the separately fed fuel is arranged to be directed during the start-up phase of the fuel cell apparatus from the afterburner for heating at least the de-sulphuring unit and/or the fuel modifying unit.

Figure 1:
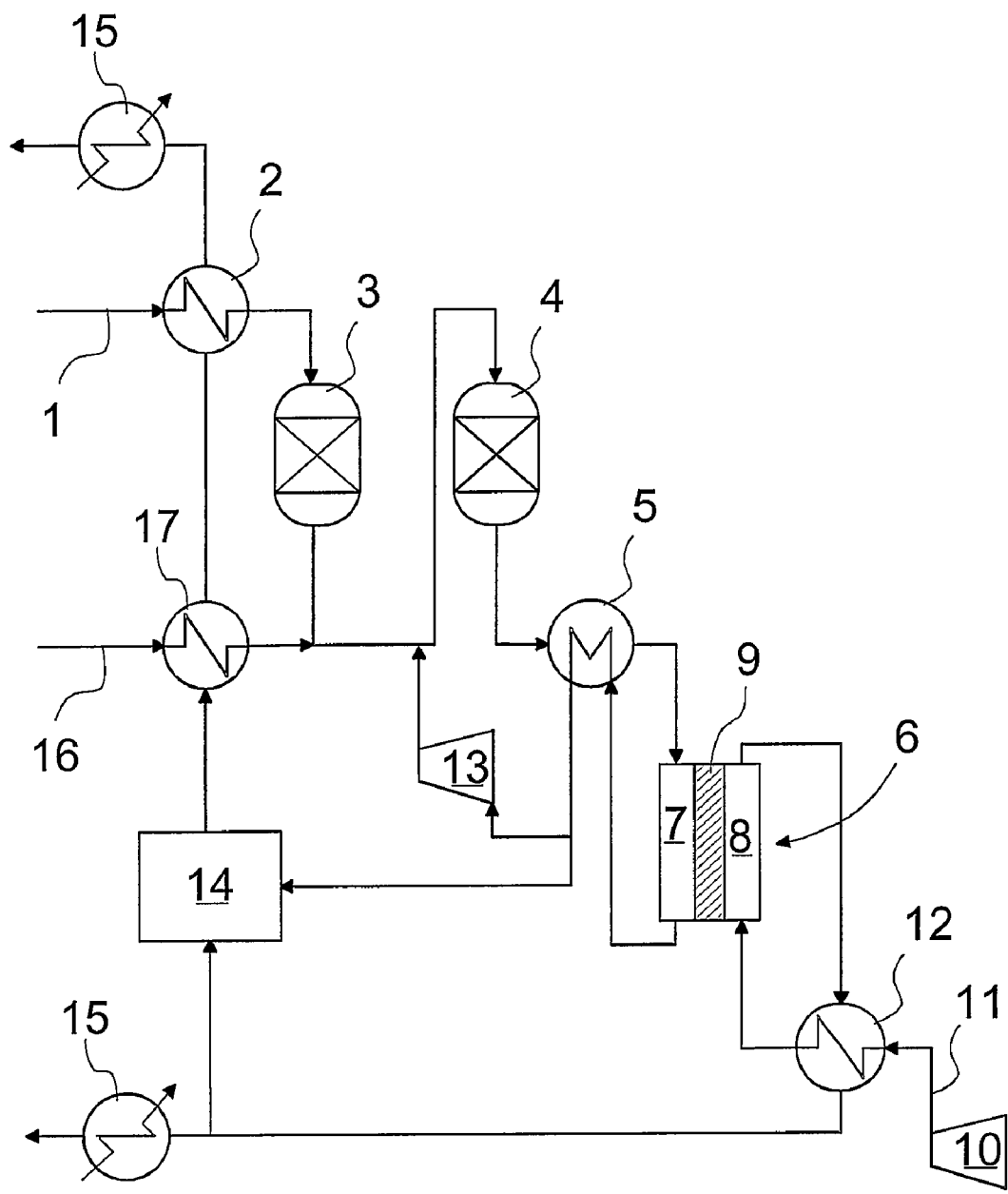

7 Claims, 2 Drawing Sheets

PREHEATING ARRANGEMENT IN A FUEL CELL APPARATUS

This is a national stage application filed under 35 USC 371 based on International Application No. PCT/FI2005/050467 filed Dec. 20, 2005, and claims priority under 35 USC 119 of Finnish Patent Application No. 20055002 filed Jan. 3, 2005.

The present invention relates to a preheating arrangement in a fuel cell apparatus, the fuel cell apparatus comprising at least a fuel cell unit, the fuel cells of which include an anode side and a cathode side and an electrolyte therebetween, the fuel cell apparatus further comprising at least a fuel inlet to the anode side and an oxygen-containing air inlet to the cathode side and a desulphurization unit, a fuel processing unit and an afterburner for combusting the exhaust gases of the anode and cathode side.

One future energy source, having a good efficiency, is the fuel cell by means of which fuel is directly transformed to electricity via a chemical reaction. A fuel cell contains two electrodes, an anode and a cathode, between which is an ion-conducting material called the electrolyte. Usually, the used fuel is natural gas or other hydrocarbon, which must usually be converted to fuel used by the fuel cell by, for example, reforming. Thus processed, the fuel is directed to the anode of the fuel cell and the oxygen necessary for combustion is introduced to the cathode of the fuel cell in the form of, for example, air. In the reaction, electrons are released from the hydrogen of the fuel gas on the anode and they travel to the cathode of the fuel cell via an external circuit, i.e. the load located subsequent to the fuel cell. Thus, hydrogen is combined with oxygen in the fuel cell, forming heat and energy, the energy being capable of being directly recovered as electric energy without the need of converting it into mechanical form. However, the potential difference created by a single fuel cell is typically so small that it is considered expedient to form a unit of a number of fuel cells connected in series, i.e. a so-called fuel cell stack, which stacks can further be connected in series or in parallel for further increasing voltage or current. The advantages of fuel cells include good efficiency, silence and very small need of moving parts. Further advantage is that being only water or water vapour, the emissions are environmentally friendly and clean.

The fuels used in a fuel cell power plant usually need some pre-processing, depending on the fuel, prior to feeding the fuel to the fuel cells. These pre-processing operations can include, among others, desulphurization, production of hydrogen from the raw material of the fuel or other catalytic or non-catalytic methods. Regardless of the methods used, the pre-processing operations are usually carried out in temperatures much higher than the ambient temperature. For this reason, the fluids of the process must be heated either by heating them prior to the actual process by means of a heat exchanger or by transferring heat to the reaction vessel or reactor, in which the actual pre-processing is carried out. It is also possible to use both of the above-mentioned methods together.

According to prior art the need of heat for preheating is carried out so that the exhaust gases produced by the afterburner are recycled through a heat exchanger, in which heat is transferred to the raw material of fuel being processed. In addition, the tubes of the system and the reaction vessels with their contents are electrically heated by means of external trace heating and heating resistors. A disadvantage of such prior art solutions is the extensive need for and consumption of external electricity during the start-up phase of the fuel cell arrangement, because the fuel cell system cannot produce enough electric energy for preheating. Another disadvantage is that using electric power for the said preheating later in said actual operating phase of the system uses a portion of the electricity produced by the fuel cells themselves. This causes a reduction of the electrical efficiency of the fuel cell apparatus.

The aim of the invention is to produce a preheating arrangement in a fuel cell apparatus by means of which the above-mentioned disadvantages of prior art can be eliminated.

The basic idea of a preheating arrangement according to the invention is that a separate fuel inlet channel has been arranged for the afterburner for feeding fuel to the afterburner during at least the start-up phase of the fuel cell apparatus and that at least a portion of the exhaust gases formed in the combustion of the separately introduced fuel is arranged to be directed during the start-up phase of the fuel cell apparatus from the afterburner for heating the desulphurization unit and/or the fuel processing unit, such as the reformer or the pre-reformer.

Further, in an embodiment according to the invention the desulphurization unit is surrounded by a casing and the fuel processing unit is surrounded by a casing, the casings being connected to channels through which at least a part of the exhaust gas of the afterburner is arranged to flow into said casings. An advantage of this arrangement is, among others, that during the start-up phase fuel and reaction vessels can be preheated without external electric energy. Another advantage is that during the operation phase fuel and the reaction vessels can be preheated to the correct temperature without using electric energy. This will increase the efficiency of the fuel cell apparatus in relation to prior art apparatuses, because it is not necessary to use the electric energy produced by the fuel cells themselves for preheating the fuel and the reaction vessels.

Figure 2:
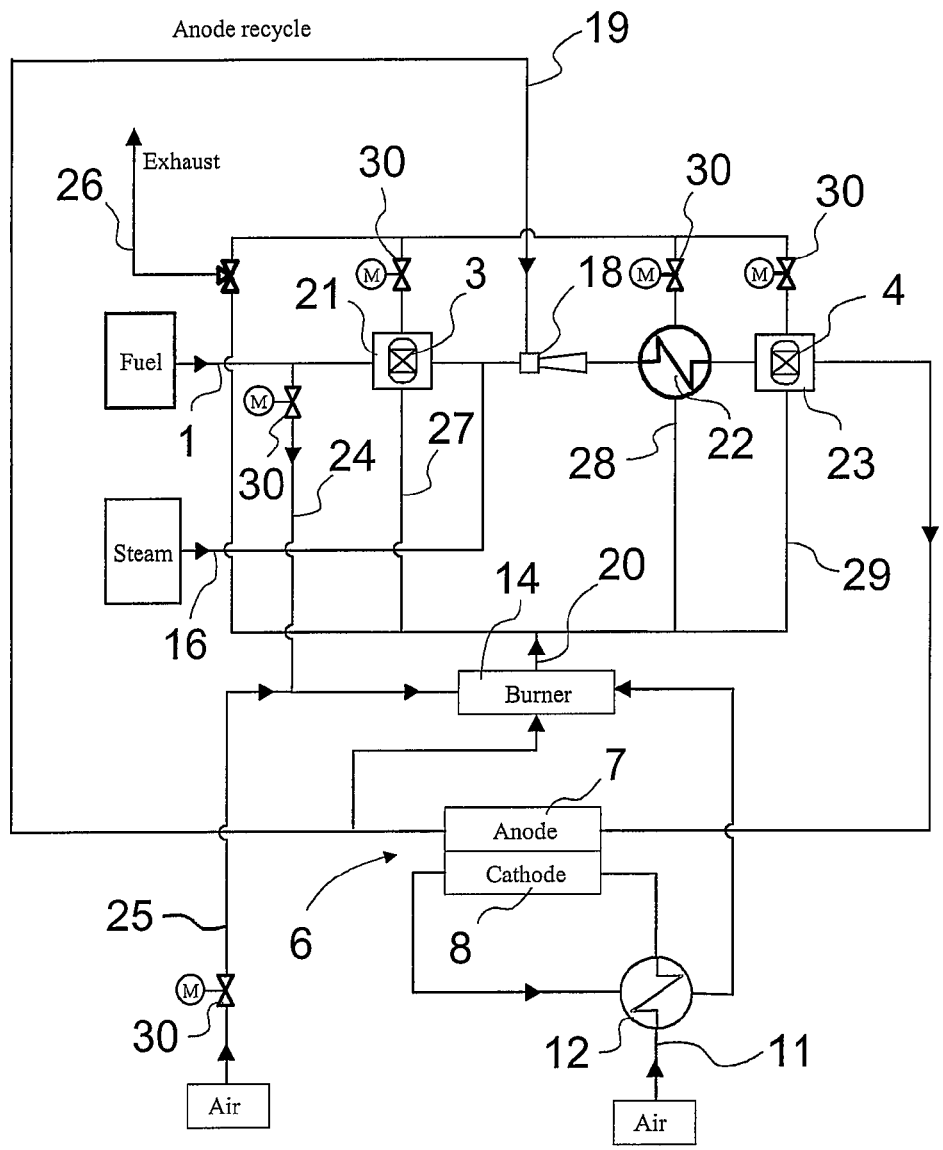

In the following the invention is disclosed in more detail by means of an exemplary embodiment and by reference to the appended drawings, in which FIG. 1 shows, schematically and in a simplified way, one typical fuel cell apparatus, and FIG. 2 shows, schematically and in a simplified way, an arrangement according to the invention being applied to a fuel cell apparatus.

FIG. 1 shows, as a simplified and schematic illustration, a typical fuel cell apparatus in which the arrangement according to the invention can be used. FIG. 1 shows a fuel cell apparatus, in which the high temperature fuel cell stacks forming the fuel cell unit 6 can consist of, for example, solid oxide fuel cells (SOFC) or molten carbonate fuel cells (MCFC) or other suitable fuel cell types. In the illustrated apparatus hydrogen, produced from, e.g. natural gas, is used as fuel. Other suitable fuels are, for example, methanol, diesel oil, kerosene and other hydrocarbon-containing materials. The natural gas is introduced into the apparatus in a pressurised state through feed line 1 via a heat exchanger 2, in which the fuel is heated by means of the heat of the exhaust gases. Subsequent to the heat exchanger 2 there is a desulphurization unit 3, in which sulphur is removed from the fuel. Subsequent to the desulphurization unit 3 the natural gas is directed into a pre-reformer or reformer 4 acting as a fuel processing unit, in which natural gas is transformed into hydrogen. Water is used for forming hydrogen, the water being introduced into the apparatus in pressurized state through an inlet duct 16 via a heat exchanger 17, in which the water is vapourized by means of the heat of the exhaust gases. In the reformer 4 the hydrocarbons of the natural gas are transformed into hydrogen, methane and carbon oxides using water vapour. In order to improve the efficiency of the operation of the apparatus part of the exhaust gases of the anode side 7 is directed via heat exchanger 5 and fan 13 to the inlet side of the reformer 4, whereby also carbon dioxide and water vapour are mixed into the inlet flow. From the reformer 4 the fuel is directed via the said heat exchanger 5 to the anode side 7 of the fuel cell unit 6 formed by fuel cell stacks. The fuel cell stacks of the fuel cell unit 6 are formed by a number fuel cells compressed together so as to be in contact with each other, each fuel cell having an anode side 7, a cathode side 8 and an electrolyte 9 therebetween. In the figure the fuel cell stacks and their possible combinations are shown schematically as an assembly. The portion of the anode side 7 exhaust gases that is not recirculated is directed into an afterburner 14, in which the residual fuel is combusted and subsequent to which the exhaust gases are introduced via heat exchangers 17, 2 and 15 away from the apparatus.

Correspondingly, oxygen is fed to the cathode side 8 along with air by means of a fan 10, wherefrom air is directed via inlet line 11 to a heat exchanger 12, in which the incoming air is preheated by means of exhaust gases from the cathode side prior to being directed to the cathode side 8. The largest portion of the heat of the cathode side exhaust gases is used for preheating the air directed to the cathode side in the heat exchanger 12, into which the cathode side exhaust gases are directed. A smaller portion of the heat is further directed to the afterburner 14 with exhaust gases and that way away from the apparatus. A portion of the heat is also conveyed directly away from the apparatus, by-passing the afterburner 14, e.g. via a heat exchanger 15.

FIG. 2 illustrates schematically and in a simplified way one solution according to the invention as applied to a fuel cell apparatus, such as an apparatus as described in FIG. 1. For the sake of clarity, FIG. 2 does not show all apparatuses shown in FIG. 1. In the apparatus the desulphurization unit 3 is surrounded by a casing 2 which is dimensioned so that its inside is suitably larger than the desulphurization unit 3 so that there is a flow space for recycled gas between the inner walls of the casing 21 and the desulphurization unit 3, the space surrounding the desulphurization unit 3 essentially at all directions. Correspondingly, the reformer 4 or a corresponding apparatus acting as the fuel processing unit is surrounded by a casing 23, the inner volume of which is dimensioned to be suitably larger than the reformer 4 so that there is a flow space for recycled gas between the inner walls of the casing 23 and the reformer 4, the space surrounding the reformer 4 essentially at all directions.

A separate fuel channel 24 is connected to the afterburner 14, via which channel unprocessed fuel is introduced to the afterburner 14. Additionally, an air channel 25 is connected to the fuel channel 24, air being introduced into the air channel by means of a fan and being mixed with the fuel prior to the fuel ending up in the afterburner 14. The mixing can be carried out in the burner itself as well, depending on the case. The fan 10 shown in FIG. 1, for example, can act as the fan, blowing air to the cathode as well.

The exhaust gas channel 20 of the afterburner 14 is accordingly routed so that exhaust gas can, when needed, be directed via further processing, if any, in addition to the exhaust gas channel 26 leading to outside, to the casing 21 of the desulphurization unit 3 along channel 27 for heating the desulphurization unit, to heater 22 along channel 28 for increasing the temperature of the fuel so as to be suitable for the reforming process and into the casing 23 of the reformer 4 along channel 29 for heating the reformer 4. Each of the said flow channels 24, 25 and 27-29 are provided with a regulating valve 30 or the like for opening and closing the channels and adjusting the gas flow rate of the channels according to the need.

The apparatus further includes an ejector 18 for carrying out the recycling of the exhaust gases of the anode side 7. The anode side exhaust gases are directed from the anode 7 to the ejector via recycling channel 19. The ejector 18 is located in the fuel inlet channel 1, for example between the desulphurization unit 3 and the reformer 4. A fan or the like apparatus can also be used instead of the ejector 18.

By means of the solution according to the invention the preheating of fuel, desulphurization unit 3 and the reformer 4 is carried out in the start-up phase of the apparatus by means of directing at least a part of raw fuel to the afterburner 14 via a separate fuel inlet channel 24 prior to desulphurization and by directing at least a portion of the exhaust gases thus combusted along channel 27 to the casing 21 of the desulphurization unit 3 for heating the desulphurization unit 3. Correspondingly, a portion of the exhaust gases of the fuel thus combusted is directed along channel 29 into the casing 23 of the reformer 4 for heating the fuel processing unit, such as the reformer 4. The temperature of the fuel is additionally increased subsequent to desulphurization by means of a heater 22 by directing a portion of the exhaust gases of the fuel directed via the separate channel 24 through channel 28 to the heater 22.

During the actual operation phase of the fuel cell apparatus, a preheating like that during the start-up phase is not needed, but exhaust gas can be directed via the same channels 27, 28 and 29 for heating the reaction vessels and for keeping their temperature at a level needed by the process. Thus, it is possible to compensate the heat losses, if any, of the process and to increase the efficiency of the process.

It is obvious to one skilled in the art that the invention is not limited to the above-mentioned example, but it can be varied within the following claims. Thus the construction of the apparatus and the construction components used can differ from those described in the above. Thereby, the desulphurization unit and the reformer or pre-reformer acting as the fuel processing unit, for example, can be located in a common casing instead of separate casings.

It will as well be obvious to one skilled in the art that the circulation of the materials to be conveyed in the apparatus, such as fuel, exhaust gases and air, does not necessarily have to be as described in the above, but the circulation can be carried out by means of a number of ways and number of apparatus configurations.

It will also be obvious to one skilled in the art that an apparatus with a different operation principle, but applicable in this application, can be used as the fuel modifying unit, depending on the configuration of the apparatus.

It will further be obvious to one skilled in the art that a solution according to the invention is not limited for use with solid oxide fuel cells (SOFC) or molten carbonate fuel cells (MCFC), but it can be used with fuel cells of other types as well.

It is additionally obvious to one skilled in the art that in addition to said natural gas other fuels applicable to be used in fuel cells can be used as fuel. Also, other suitable material can be used instead of hydrogen, whereby a corresponding fuel processing unit will be used instead of the reformer.

The invention claimed is:

1. A preheating arrangement in a fuel cell apparatus, the fuel cell apparatus comprising at least a fuel cell unit, the fuel cells of which are solid oxide fuel cells or molten carbonate fuel cells and include an anode side and a cathode side and an electrolyte therebetween, the fuel cell apparatus further comprising at least a fuel inlet to the anode side and an oxygen-containing air inlet to the cathode side and a desulphurization unit, a reformer and an afterburner for combusting the exhaust gases of the anode and/or cathode side, the afterburner being provided with a separate fuel inlet channel for feeding fuel to the afterburner in at least the start-up phase of the fuel cell apparatus, and the arrangement further comprising a first channel leading from the afterburner directly to the desulphurization unit and a second channel leading from the afterburner directly to the reformer for directing at least a portion of the exhaust gases formed in the combustion of the separately fed fuel during the start-up phase of the fuel cell apparatus from the afterburner for heating at least the desulphurization unit and the reformer, wherein the first and second channels are provided with respective regulating valves or the like for adjusting the flow rates of the first and second channels.

2. A preheating arrangement according to claim 1, wherein the desulphurization unit is surrounded by a casing and the reformer is surrounded by a casing, the casings being connected to channels having regulating valves, through which channels at least a part of the exhaust gas of the afterburner is arranged to be directed to the casings.

3. A preheating arrangement according to claim 2, wherein at least a portion of the exhaust gases of the afterburner is arranged to be directed into the casing of the desulphurization unit, the casing of the reformer and to a heater located in the fuel inlet channel through the channels connected to the exhaust gas channel of the afterburner during normal operation of the fuel cell apparatus as well.

4. A preheating arrangement according to claim 1, wherein the separate fuel inlet channel is connected to the fuel inlet channel prior to the desulphurization unit.

5. A preheating arrangement according to claim 1, wherein an air channel is connected to the separate fuel channel for introducing additional air to the afterburner.

6. A preheating arrangement according to claim 5, wherein the fuel inlet channel and the air channel are provided with respective regulating valves or the like for opening and closing the channels.

7. Fuel cell apparatus comprising:
    a fuel cell unit composed of solid oxide or molten carbonate fuel cells and having an anode side and a cathode side,
    a fuel supply inlet connected to the anode side of the fuel cell unit for delivering fuel to the anode side,
    an oxygen supply inlet connected to the cathode side of the fuel cell unit for delivering oxygen to the cathode side,
    a means for collecting exhaust gases from at least one of the anode side and the cathode side of the fuel cell unit,
    a desulphurization unit and a reformer connected for receiving fuel from a fuel source and supplying fuel to the fuel supply inlet,
    an afterburner for combusting exhaust gases collected by the exhaust gas collecting means,
    a fuel inlet duct for supplying fuel to the afterburner,
    exhaust gas ducts for delivering exhaust gases from the afterburner directly to the desulphurization unit and the reformer, and
    regulating valves for adjusting flow rate of exhaust gases from the afterburner to the desulphurization unit and the reformer respectively.

* * * * *